(12) United States Patent
Lawrow

(10) Patent No.: US 8,442,164 B2
(45) Date of Patent: May 14, 2013

(54) CORRELATION PEAK LOCATION

(75) Inventor: Ivan Lawrow, Sheffield (GB)

(73) Assignee: NXP B.V., Eindhoven (NL)

( * ) Notice: Subject to any disclaimer, the term of this patent is extended or adjusted under 35 U.S.C. 154(b) by 699 days.

(21) Appl. No.: 12/191,780

(22) Filed: Aug. 14, 2008

(65) Prior Publication Data
US 2010/0040117 A1 Feb. 18, 2010

(51) Int. Cl.
*H04L 27/06* (2006.01)

(52) U.S. Cl.
USPC ........... 375/343; 375/147; 375/148; 375/149; 375/150; 375/151; 375/152; 370/335; 370/342

(58) Field of Classification Search .......... 375/147–152; 370/335, 342–344
See application file for complete search history.

(56) References Cited

U.S. PATENT DOCUMENTS

| | | | | |
|---|---|---|---|---|
| 6,996,162 B1 * | 2/2006 | Hosur et al. | .................. | 375/150 |
| 7,796,694 B1 * | 9/2010 | O'Connor et al. | ............ | 375/242 |
| 7,899,110 B1 * | 3/2011 | Zhang et al. | .................. | 375/150 |
| 2003/0123408 A1 * | 7/2003 | Saitou | ............................ | 370/335 |
| 2009/0290664 A1 * | 11/2009 | Walton et al. | ................. | 375/344 |

OTHER PUBLICATIONS

ZigBee Document 053474r06, Version 1.0, 2005.
IEEE Std 802.15.4™-2006, Wireless Medium Access Control (MAC) and Physical Layer (PHY) Specifications for Low-Rate Wireless Personal Area Networks (WPANs), Sep. 2006.
IEEE Std 802.15.4a™-2007, Wireless Medium Access Control (MAC) and Physical Layer (PHY) Specifications for Low-Rate Wireless Personal Area Networks (WPANs), Aug. 2007.

* cited by examiner

*Primary Examiner* — Daniel Washburn
*Assistant Examiner* — Eboni Hughes

(57) ABSTRACT

Apparatus for determining a location of a peak in correlation output samples, the apparatus being arranged to receive samples from at least one correlator over a plurality of symbol time periods; combine samples from a period that is longer than the symbol time period into combined samples; and determine the position of a peak in the combined samples.

21 Claims, 9 Drawing Sheets

CORRELATION PEAK LOCATION

FIELD OF THE INVENTION

Embodiments of the present invention relate to correlation peak location, for example determining the location of a peak in correlation data from one or more correlators in a wireless receiver or transceiver.

BACKGROUND TO THE INVENTION

Direct Sequence Spread Spectrum (DSSS) signals are formed from pseudo-random noise (PN) codes. A PN code is a binary sequence of chips (or bits). The PN code has a higher bit rate than the symbols represented by the PN codes. In some systems, each PN code is used to represent a unique data symbol. In other systems, a single PN code can be used to represent multiple symbols by changing the polarity of the transmitted PN code. DSSS receivers perform a correlation process between a received signal and the PN codes specific to that particular communication system. The magnitude of the correlation result indicates the extent to which the received signal and the symbol PN codes are matched in phase. The correlation process may involve comparing the received signal with the PN code at various different relative phases to produce multiple correlator output samples. The location of a distinct peak in the correlator output samples may be used to determine an arrival time of the received signal.

Some communication systems are designed specifically to facilitate the accurate resolution of arrival time. For example, the Global Positioning Satellite (GPS) system uses a 1023-chip long PN code to enable accurate resolution of the arrival time to take place in the receiver at a minimum specified signal-to-noise ratio (SNR) of operation. Using shorter PN codes may cause noise to have a more significant effect on a received signal. For example, a chip in a PN code will constitute a greater proportion of the complete PN code if the PN code is shorter, and therefore noise affecting a chip will have a more significant effect when a shorter PN code is used.

DSSS receivers may perform a synchronisation process at the start of reception of a signal to establish the coarse timing of the received data symbols. The coarse timing is determined by identifying the instances at which distinct correlation peaks occur in the correlator output samples. The synchronisation process may also include a search for a predefined sequence of symbols (or PN codes) that is prefixed to the main body of the signal. The predefined sequence is commonly known as a preamble. A preamble search is performed to reduce the possibility of the receiver falsely detecting the start of a valid message.

Examples of DSSS communication systems include the IEEE 802.15.4 standard, and also other standards based on 802.15.4 such as ZigBee. Published standards and technical documents describing these and other DSSS communication systems are incorporated herein by reference for all purposes. An example of a published standard is the 802.15.4-2006 standard, or the 802.15.4a-2007 standard, available from http://www.ieee802.org/15/pub/TG4.html. Examples of technical documents describing the ZigBee communication system are available from http://www.zigbee.org/en/spec_download/zigbee_downloads.asp.

It is an object of embodiments of the invention to at least mitigate one or more of the problems of the prior art.

SUMMARY OF THE INVENTION

According to a first aspect of embodiments of the invention, there is provided apparatus for determining a location of a peak in correlation output samples, the apparatus being arranged to receive samples from at least one correlator over a plurality of symbol time periods; combine samples from a period that is longer than the symbol time period into combined samples; and determine the position of a peak in the combined samples.

A peak in the combined samples may incorporate multiple peaks in correlator output samples from respective symbol time periods. Thus, in embodiments of the invention, the peak in the combined samples may be less sensitive to noise and/or is more accurate. Embodiments of the invention may allow the location of the peak in the combined samples to be determined accurately and/or reliably, even in systems that use short pseudonoise (PN) codes to encode the symbols.

The location of the peak may be useable to determine a time at which a symbol or communication has arrived. This time information may in turn be used, for example, in location awareness systems that determine information relating to the location of a device based on a time of arrival of one or more communications at that device.

To determine the combined samples, embodiments of the invention may, for example, combine samples from two complete or incomplete time periods, three complete or incomplete time periods, or more than three complete or incomplete time periods. A complete time period is a time period that that is at least one whole symbol time period in duration and includes samples corresponding to at least one complete transmitted symbol. All samples or just selected samples may be combined. For example, in certain embodiments of the invention, samples comprising or including the peak sample and samples around the peak sample from two, three or more symbol time periods are combined to form the combined samples.

Thus, for example, the combined samples are produced from samples that are taken from a period of time that is longer than a single symbol time period.

In certain embodiments of the invention, there are multiple correlators. For example, each of the symbols in a wireless communications system may be transmitted by transmitting a PN code corresponding to the symbol. Therefore, each correlator is arranged to look for the PN code of an associated symbol. For example, in a system transmitting two symbols each using a respective PN code, there may be two correlators. In certain embodiments of the invention, the apparatus is arranged to combine the samples by determining a maximum sample of corresponding samples from each of the correlators, and combining the maximum samples into the combined samples. The corresponding samples from each of the correlators may be, for example, the samples that are provided from the correlators at the same time. In a system where there are two correlators, the apparatus determines the maximum of the two values provided at the same time by the correlators. Thus, peaks from either correlator are considered and are combined into the combined samples.

In certain embodiments, the apparatus is arranged to combine the samples by combining the samples from corresponding positions in each of the sample time periods. The corresponding positions are those positions at the same point in time or having the same sample number during each symbol time period. The symbol time period is the length of time or number of samples between symbols that are represented by received PN codes. For example, in a 802.15.4 wireless communication system, a PN code corresponding to a symbol may comprise 32 chips. That is, each transmitted symbol is represented by 32 transmitted chips. Different symbols are represented by transmitting different 32-chip sequences. At an oversampling rate of 16 in the receiver, there will be 512 samples from the or each correlator in each sample time period. Samples at corresponding positions may comprise, for example, those samples at position 256 in multiple symbol time periods.

In certain embodiments, the apparatus is arranged to combine the samples by determining a sum of samples from corresponding positions in each of the sample time periods. Thus, there is a simple combining of samples at corresponding positions.

In certain embodiments, the apparatus is arranged to determine the position of a peak in the samples during a selected sample time period. The selected sample time period may be, for example, the time period in which the first symbol is received, the time period of the first symbol received after the peak location determination process has begun, or any other time period. The peak from the selected time period may be used to consider only selected symbols around this peak from all symbol time periods, as it is expected that the peak will remain in approximately the same position within the symbol time period between symbol time periods.

In certain embodiments, the apparatus is arranged to combine the samples by combining a predetermined number of samples from each of the sample time periods around the sample corresponding to the peak in the selected time period into the combined samples. So, for example, embodiments of the invention are arranged to consider only a limited number of samples that includes the sample at the (possibly approximate) location of the peak and also a number of samples either side of the peak position. This may provide a curve that may be used in an interpolation process such as curve fitting to determine the location of the peak of the combined samples, even if this peak occurs at a point between samples. For example, parabolic curve fitting, least squared error, or some other curve fitting or interpolation method, may be used to determine the location of the peak.

In certain embodiments, the apparatus is arranged to determine the absolute values of the samples from the at least one correlator. In wireless communication systems where a single PN code can be used to transmit two different symbols by selecting the polarity of the PN code, each correlator may provide a positive or negative peak corresponding to the transmitted symbol. Thus, taking the absolute values of the correlator outputs instead of the true values allows the peaks to be processed identically without regard to the symbol being transmitted. Peaks corresponding to either transmitted symbol may be combined into the combined samples.

According to a second aspect of embodiments of the invention, there is provided a method of determining a location of a peak in correlator output samples, the method comprising receiving samples from at least one correlator over a plurality of symbol time periods; combining samples from a period that is longer than the symbol time period into combined samples; and determining the position of a peak in the combined samples.

According to a third aspect of embodiments of the invention, there is provided a method of determining an arrival time of a communication, the method comprising providing a received signal including the communication to at least one device for determining a correlation factor between the received signal and at least one code corresponding to the communication, combining correlation factors from the device from time periods corresponding to at least two communication time periods to produce combined correlation factors, finding a location of one of a maximum and minimum within the combined correlation factors, and determining the arrival time of the communication from the location.

According to a fourth aspect of embodiments of the invention, there is provided a system for determining an arrival time of a communication, the system being arranged to provide a received signal including the communication to at least one device for determining a correlation factor between the received signal and at least one code corresponding to the communication, combine correlation factors from the device from time periods corresponding to at least two communication time periods to produce combined correlation factors, find a location of one of a maximum and minimum within the combined correlation factors, and determine the arrival time of the communication from the location.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
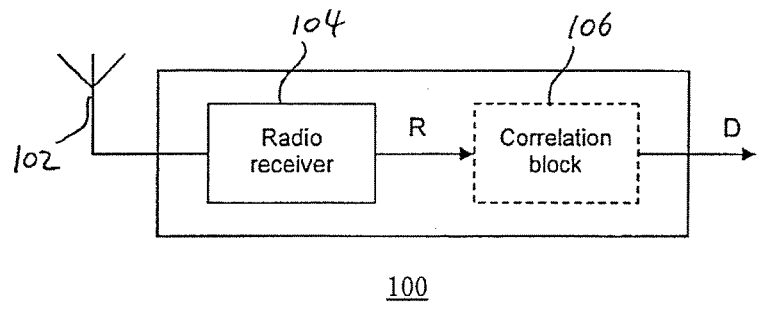
FIG. 1 shows an example of a DSSS receiver.

FIG. 1 shows an example of a DSSS receiver 100 suitable for use in a Direct Sequence Spread Spectrum (DSSS) communication system. The receiver 100 includes an antenna 102 for receiving wireless signals, and a radio receiver 104 for demodulating received signals and producing a demodulated signal R. The demodulated signal R is a digital signal that represents the received signal. Preferably, the sample rate of the received signal is equal to or higher than the chip rate of the chips in the PN codes of the communication system. For example, the sampling rate of the demodulated signal R is 16 times higher than the chip rate of the PN codes.

The demodulated signal R is then provided to a correlation block 106 which determines the PN codes (if any) within the demodulated signal R and produces a bit stream D of data symbols that were contained within a received signal.

The correlation block 106 includes a single correlator where a single PN code is used to transmit a binary signal by changing the polarity of the PN code, or multiple correlators in parallel where different PN codes are used to transmit different symbols. Where there are multiple correlators, each correlator is associated with a respective PN code. Each correlator outputs an indication of the level of correlation between a received signal and its respective PN code.

Figure 2:
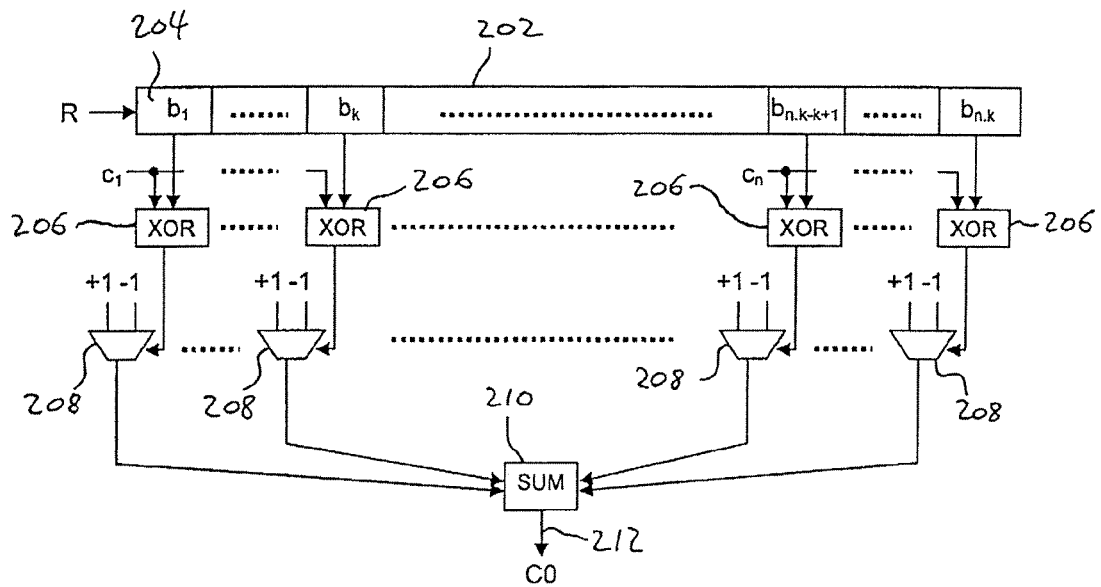
FIG. 2 shows an example of a correlator.

An example of a correlator 200 is shown in FIG. 2. The correlator 200 includes a shift register 202. The demodulated signal R is fed into the first bit 204 of the shift register 202 at bit position $b_1$. When a bit is fed into the first bit position 204, all the other bits within the shift register are shifted along the shift register 202, and the last bit is discarded. There are nk bit positions within the shift register 202, where n is the number of chips in the PN code associated with the correlator (i.e. the number of chips used to transmit a symbol), and k is the oversampling rate of the demodulated signal R. For example, where there are n=32 chips in a PN code, and an oversampling rate of k=16 is used to sample a received signal, there are 512 bit positions within the shift register 202, from $b_1$ to $b_{512}$. Thus, the shift register 202 holds information corresponding to one symbol period.

Each bit position is associated with an XOR logic block 206. The XOR logic block 206 has two inputs. The first input is the bit associated with the XOR logic block 206. The second input is a chip of the PN code associated with the correlator 200. The chip provided to the XOR logic block 206 depends on the bit position of the bit in the shift register 202 associated with the XOR logic block 206. For example, there are n chips in the PN code, $c_1, \ldots, c_n$. The XOR logic blocks 206 associated with shift register bits $b_1$ to $b_k$ are provided with $c_1$, the next k logic blocks 206 (associated with $c_{k+1}$ to $c_{2k}$) are provided with $c_2$, and so on. Each XOR logic block 206 performs a logic XOR on the inputs provided to it and outputs the result to a respective multiplexer 208. The multiplexer 208 outputs a signal representing either +1 or −1 depending on the result from the associated XOR logic block. For example, where the XOR logic block 206 outputs a logic 0 indicating that the inputs to the XOR logic block 206 are logically equal, then the multiplexer outputs +1, and where the XOR logic block 206 outputs a logic 1 indicating that its inputs are not equal, the multiplexer 208 outputs a signal representing −1. The outputs from the multiplexers 208 are provided to a sum block 210 which sums the outputs from the multiplexers 208. The result of the sum operation is output from the sum block as output 212. This output 212 is output from the correlator 200 as correlation value C0.

The correlation value C0 indicates the degree to which the bit sequence stored in the shift register 202 matches the bit sequence of chips of the associated PN code. For example, where the bit sequence matches the PN code closely, the outputs of the multiplexers 208 will be mainly +1, providing a high positive output 212 from the sum block 210 and thus a high positive output C0 from the correlator 200. Alternatively, where the bit sequence in the shift register 202 does not closely match the PN code, then the output from the multiplexers 208 will be a mixture of +1 and −1, and the sum block 210 will output a value that is close to zero or contains noise. In embodiments of the invention where the communication system is implemented such that the polarity of a received PN code indicates a symbol being transmitted, where the sequence on the shift register 202 is a close match of the negative of the PN code, the sum block 210 outputs a large negative value. In alternative embodiments of the invention, the correlator 200 may be implemented in other ways such that the correlator output C0 indicates a high or low correlation between the bit sequence in the shift register 202 and the PN code associated with the correlator 200.

Figure 3:
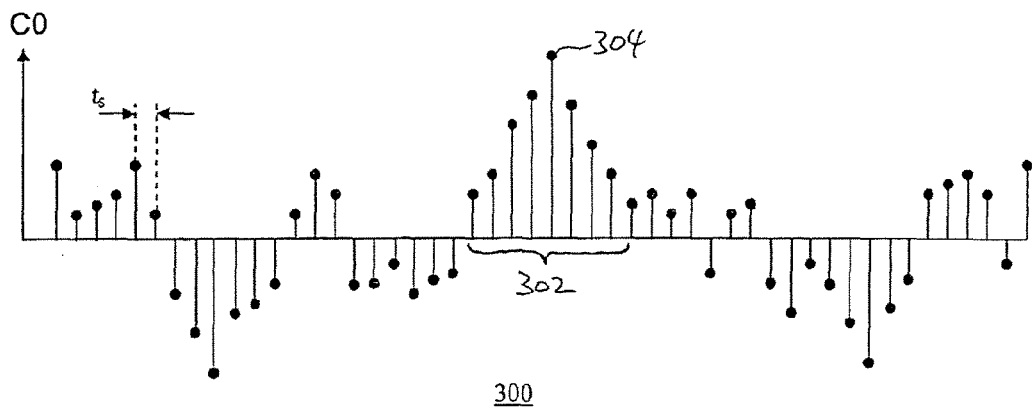
FIG. 3 shows an example of a signal comprising output samples from a correlator.

FIG. 3 shows a graph 300 of example correlator output samples over a period of time. The sample period between successive samples is $t_s$. There is a general increase in value of the samples during a time period 302, with a peak sample 304. These are caused by a received signal that has a PN code associated with the correlator that produced the correlator output samples 300. At the peak 304, it is likely that the received signal is fully aligned with the PN code within the correlator. In certain embodiments of the invention, the correlator output can be used to determine when a PN code associated with the correlator has been received, for example by detecting peaks such as the peak 302.

Figure 4:
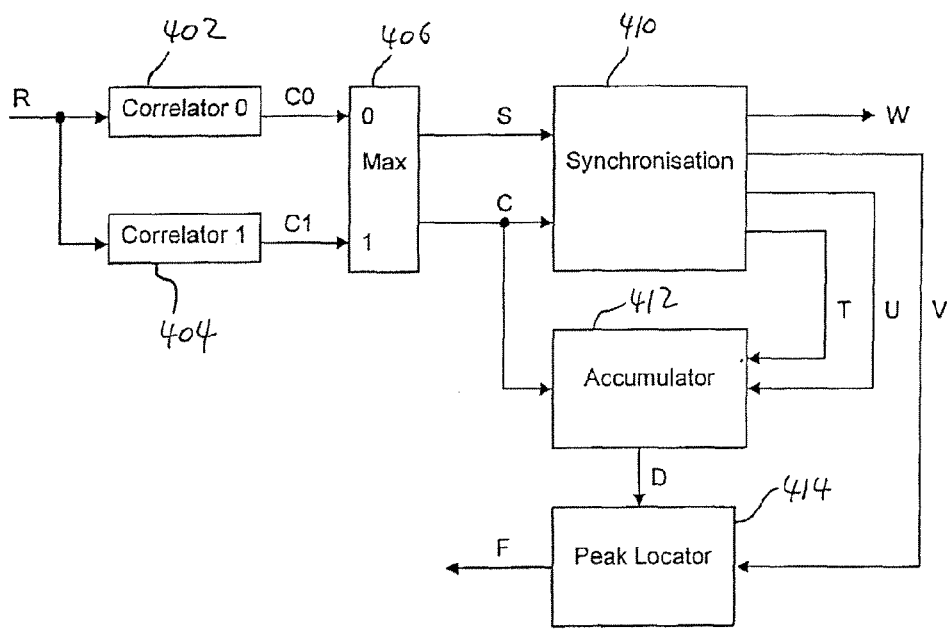
FIG. 4 shows an example of a correlation block according to embodiments of the invention.

FIG. 4 shows an example of a correlation block 400 according to embodiments of the invention. The correlation block 400 is used in a wireless communication system where two PN codes are used, each to transmit a respective data symbol. Thus there are two correlators 402 and 404 in parallel, each receiving a bit sequence R from the radio receiver 104 shown in FIG. 1. In certain embodiments of the invention, there is a single shift register 202 that is shared between all of the correlators, although in alternative embodiments of the invention there may be multiple shift registers, each providing data to one or more correlators.

The outputs C0 and C1 from the correlators 402 and 404 respectively are provided to a max block 406. The max block 406 outputs a sample C which is the maximum of the samples C0 and C1 provided to the max block 406 from the correlators 402 and 404. The max block 406 also outputs a symbol signal S that indicates which sample is selected as the maximum, i.e. which correlator provides each sample C.

Figure 5:
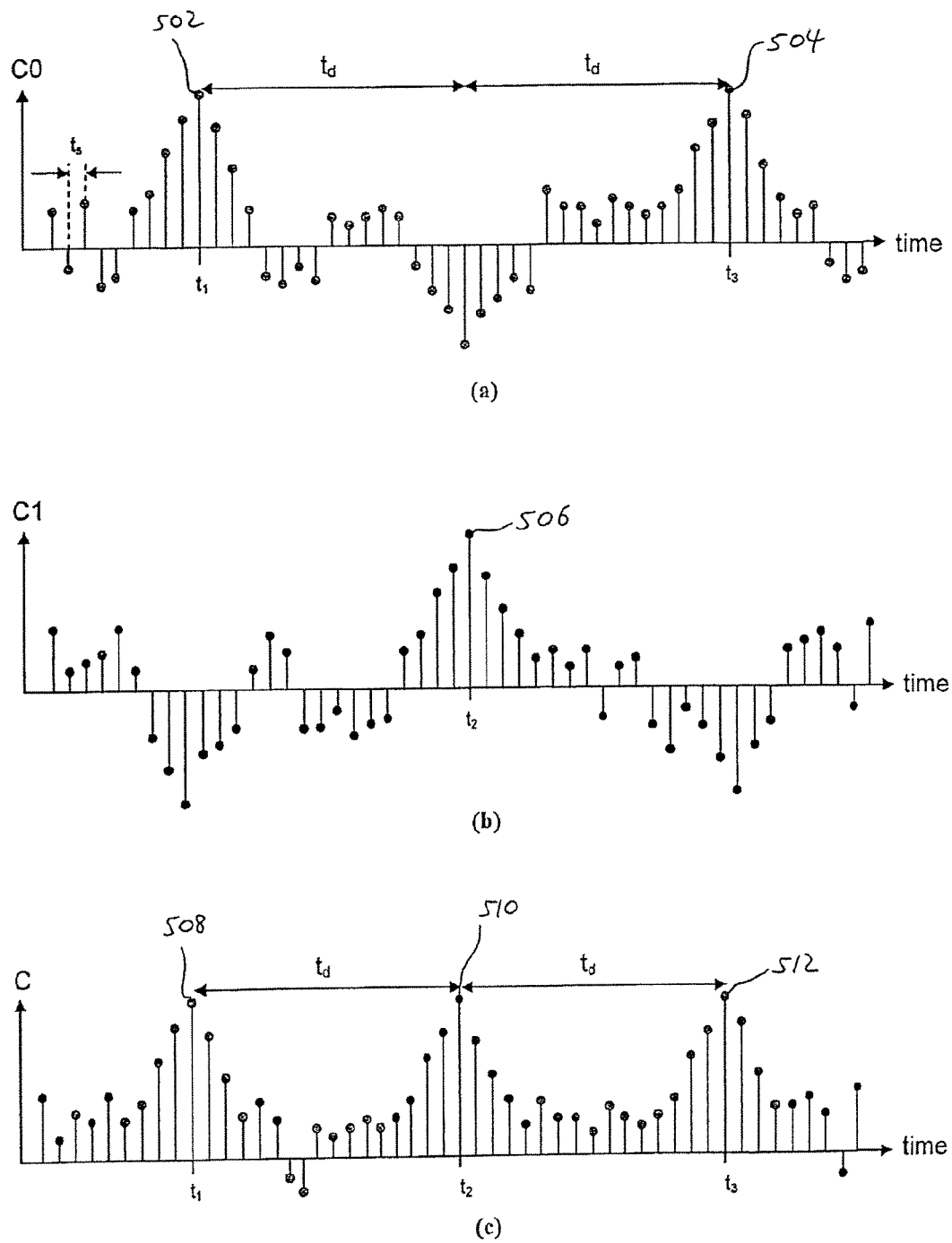
FIG. 5 shows examples of signals generated in the correlation block.

FIG. 5(*a*) shows an example of output samples C0 from the first correlator 402 over a period of time. FIG. 5(*b*) shows an example of output samples C1 from the second correlator 404 over the same period of time. FIG. 5(*c*) shows an example of the output samples C from the max block 406 over the same period of time, where each sample C is the maximum of the samples C0 and C1 that are provided at the same time. The symbol period (i.e. the time between receipt of different symbols) is $t_d$. Thus, for example, the samples C0 indicate that a symbol associated with the first correlator 402 is received at a time $t_1$, and another is received at a time $t_3$, as indicated by peaks 502 and 504 respectively. The samples C1 indicate that a symbol associated with the second correlator 404 is detected at time $t_2$, as indicated by peak 506. Detection of the symbols may be performed, for example, by detecting peaks in the samples from each correlator.

Embodiments of the invention are intended for determining the point during a symbol time period $t_d$ when a bit sequence in the (or each) shift register 202 is detected as a corresponding PN code by any of the correlators in the correlation block 106. Other information can be derived from the point in time of detection, if required, such as the time of arrival of symbols at the receiver. Thus, for this purpose it is not important what the received symbols are. Therefore, in embodiments of the invention the maximum samples C are considered for this purpose, as the maximum samples should contain peaks from both correlators 402 and 404 (or all correlators in embodiments of the invention where three or more correlators are used). The example maximum samples C shown in FIG. 5(*c*) include three peaks 508, 510 and 512 corresponding to peaks 502, 506 and 504 respectively.

Referring back to FIG. 4, the signals S and C are provided to a synchronisation block 410. The maximum samples C are also provided to an accumulator block 412. The accumulator block 412 accumulates samples around peaks from a number of different time periods as explained in more detail below. The synchronisation block 410 also provides signals T and U to the accumulator clock 412. The signal T indicates the start of a process for determining the position of a peak in correlator output samples, and the signal U indicates the samples which should be accumulated, as explained in more detail below. The synchronisation block 410 may output, for example, a data signal W comprising the data bits transmitted in the received signals as PN code symbols.

FIG. 6(a) shows the maximum samples C from FIG. 5(a). FIG. 6(b) shows the signal S, indicating the correlator which produced the corresponding sample C. As there are two correlators, the signal S may be a binary signal. FIG. 6(c) shows the signal T that is used by the synchronisation block 410 to indicate to the accumulator block 412 the start of a period to locate a peak in the correlator output samples. FIG. 6(d) shows the signal U that is used by the synchronisation block 410 to indicate to the accumulator block 412 which samples to combine in an accumulation process. FIG. 6(e) shows the signal V that is used by the synchronisation block 410 to indicate to a peak locator 414, shown in FIG. 4, the end of the accumulation process. The signals C, S, T, U and V all have the same sample period $t_s$, although in other embodiments of the invention the sample periods may vary between signals and/or between samples.

At the start of a process for determining the location of a peak in the correlator output samples according to embodiments of the invention, the synchronisation block 410 sends a signal T to the accumulation block 412 as shown by sample 602 in the signal T in FIG. 6(c). This causes the accumulation block to reset and begin to combine samples C according to the signal U. The signal U is a signal from the synchronisation block 410 that indicates which samples to combine. That is, it comprises a binary signal with pulse width $t_p$ and period $t_d$, the same as the inter-symbol period of the signal received by the receiver 100. The pulse (during the period $t_p$) of the signal $t_p$ is preferably substantially centred on the peaks present in the maximum correlator output samples C and is wide enough to include a predetermined number of samples either side of each of the peaks, or either side of a position that is the approximate position of the peaks. The synchronisation block 410 may centre the first pulse of U, for example, at the point where a first peak is detected in C following the start of the peak location process (i.e. at the sample 604), or based on samples preceding the start of the process, or using any other method. The width $t_p$ of the pulse may be predetermined, for example, and the period $t_s$ of the signal U is known by the synchronisation block as this is the inter-symbol period of the symbols transmitted in the communication system.

Figure 7:
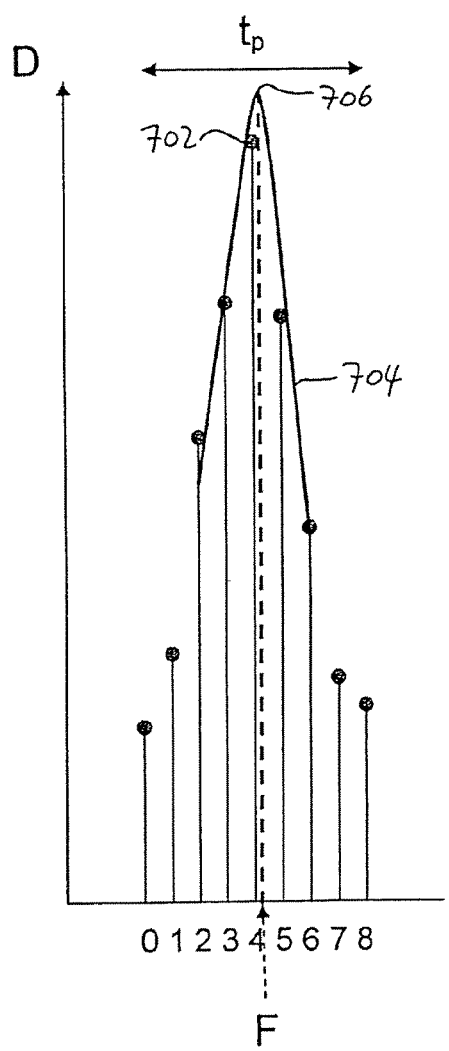
FIG. 7 shows an example of combined samples and curve fitting.

The signal U is used by the accumulator to combine corresponding samples from the signal C from different symbol periods. For example, a communication system used with an embodiment of the invention may use PN codes with 32 chips to transmit each symbol. If an oversampling rate of 16 is used in the radio receiver 102, each correlator will output 512 symbols in each symbol time period. If, for example, the sample in the signal C at the start of a pulse in the signal U is the 252nd sample $C_{252}$ in a symbol time period, the accumulator combines the samples $C_{252}$ from multiple symbol time periods, as indicated by the first sample 606 in each pulse $t_p$ in the signal U. The signal U thus also indicates to the accumulator block 412 to combine other corresponding samples from multiple time periods. As a result, combined samples D are produced from multiple time periods. The combined samples D should comprise a generally curved profile including a peak. An example of a signal D comprising combined samples is shown in FIG. 7, where combining multiple samples comprises summing the values of the multiple samples.

Figure 6:
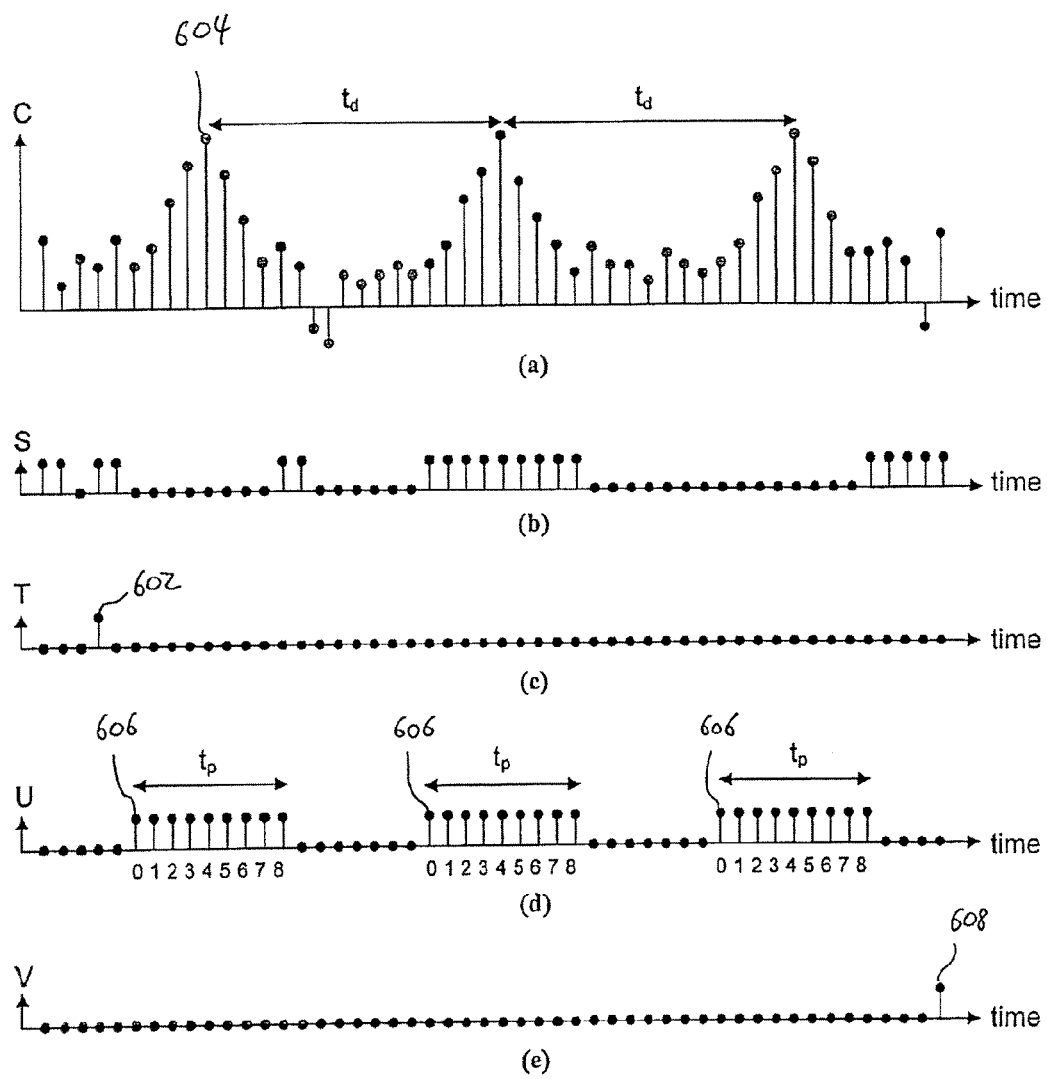
FIG. 6 shows examples of further signals generated in the correlation block.

As shown in FIG. 6, a signal V is generated by the synchronisation block 410 to indicate that a sufficient number of symbol time periods have elapsed and samples of the maximum correlator signal C from a sufficient number of symbol time periods have been combined. For example, this may be a predetermined number of symbol time periods or some other number that is determined. The synchronisation block issues a sample 608 in the signal V to indicate to the peak locator 414 that a sufficient number of symbol time periods have elapsed. The peak locator then receives the combined samples D from the accumulator block 412 and determines the location of a peak in the combined samples D.

The peak locator 414 may locate a peak in the combined samples using one of a number of methods. For example, in embodiments of the invention, the peak locator 414 may use interpolation to determine the location of a peak, even if the peak is located at a position between samples in the combined samples D.

An example of an interpolation process using quadratic curve fitting is described below, although other curve fitting/interpolation techniques may additionally or alternatively be used. In this example, the three points around and including the peak sample in the combined samples D are considered for simplicity, and are fitted to the following quadratic equation:

$$y = Ax^2 + Bx + C \quad (1)$$

The values $Y_{-1}$, $Y_0$ and $Y_1$ are the Y-axis values (i.e. magnitudes) of the sample to the left of the peak sample, the peak sample and the sample to the right of the peak sample respectively. Three simultaneous equations are formed by inserting these values and their corresponding x values into equation (1). The x values are considered to be, for example, the sample number relative to the peak sample (sample 702 in FIG. 7), i.e. −1, 0 and +1 respectively:

$$Y_{-1} = A - B + C \quad (2a)$$

$$Y_0 = C \quad (2b)$$

$$Y_{+1} = A + B + C \quad (2c)$$

Solving these equations (2a), (2b) and (2c) yields the coefficients of (1):

$$B = \frac{1}{2}(Y_{+1} - Y_{-1}) \quad (3a)$$

$$A = \frac{1}{2}(Y_{+1} + Y_{-1} - 2Y_0) \quad (3b)$$

Equation (1) can be differentiated to determine the slope of the curve:

$$\frac{dy}{dx} = 2Ax + B \quad (4)$$

The minimum of the curve occurs where the slope is zero, i.e.:

$$x = -\frac{B}{2A} \quad (5)$$

Using the values of A and B from equations (3a) and (3b), x at the minimum can be determined as follows:

$$x = \frac{1}{2}\left(\frac{Y_{-1} - Y_{+1}}{Y_{+1} + Y_{-1} - 2Y_0}\right) \quad (6)$$

This is relatively simple to implement using hardware. However, higher order curves and/or fitting more points may be used, but may require more complex hardware. Alternatively, the curve fitting process may be implemented in software or a combination of hardware and software. In alternative implementations of the invention, other values of x may be used, for example the sample number of the samples within a symbol time period, the sample number of the samples within the combined samples D (as shown in FIG. 7), and other values of x.

For example, as shown in FIG. 7, a curve 704 is fitted to the peak sample 702 and the four samples around the peak sample 702, i.e. the two samples both sides of the peak sample 702. Interpolation is then used to determine the point of the peak 706 of the fitted curve, which occurs at an x value F. The peak locator 414, shown in FIG. 4, may output the value of F.

Thus, in embodiments of the invention, the position of the peak 706 of the fitted curve is based on information from multiple symbol time periods, not from a single symbol time period. Furthermore, embodiments of the invention do not require a predetermined symbol sequence or preamble to be transmitted in order that the location of the peak, and thus other information, may be determined. Other information determined from the location of the peak may include, for example, a time of receipt of a communication, PN code or data symbol. Determining other information from the location of the peak 706 may require certain information, such as, for example: the properties of the signal U shown in FIG. 6(d) and/or any information used to generate that signal; the number of signal time periods from which samples were combined to generate the combined samples D; and/or any other information.

Figure 8:
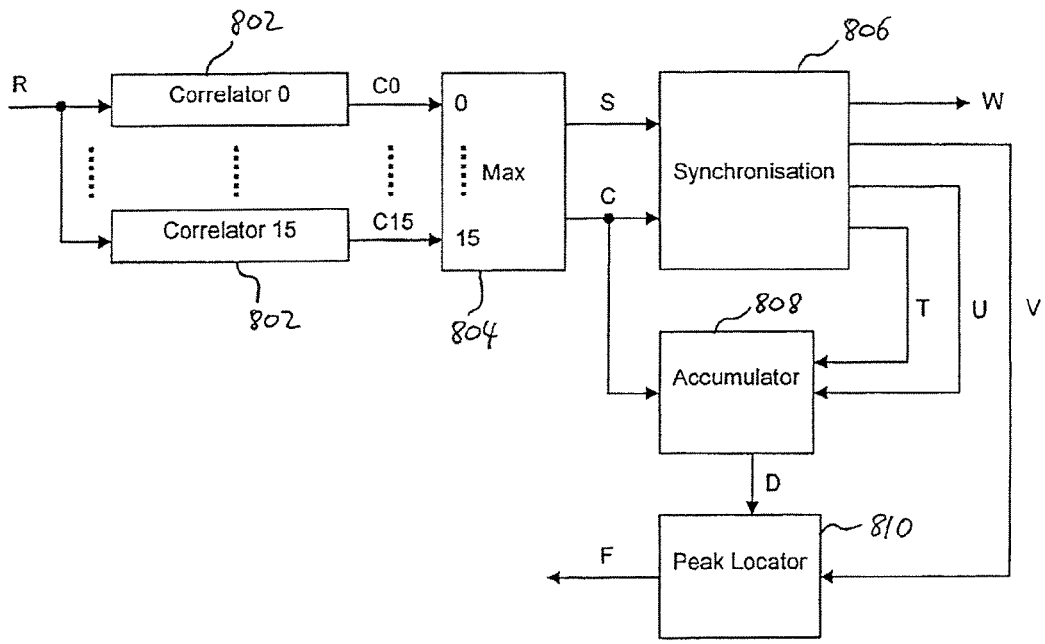
FIG. 8 shows another example of a correlation block according to embodiments of the invention.

FIG. 8 shows an example of a correlation block 800 according to alternative embodiments of the invention. The correlation block 800 includes sixteen correlators 802. The correlation block 800 may be used, for example, in a communication system where a received symbol is represented by one of sixteen possible PN codes, each correlator 802 associated with a respective one of the PN codes. Thus, each symbol may convey four bits of data, for example.

The sixteen outputs of the correlators 802 are provided to a max block 804. The max block selects the maximum of samples provided by the correlators 802 in a manner similar to that described above with respect to the max block 406 shown in FIG. 4. The max block outputs a maximum sample signal C and a symbol signal S to a synchronization block 806. The symbol signal S may be, for example, a four-bit signal indicating which correlator 802 provided each sample in the maximum sample signal C. The synchronisation block 806 provides signals T and U to the accumulator block 808, and a signal V to a peak locator 810. The synchronisation block 806, accumulator block 808 and peak locator 810 operate in a manner similar to that described above in respect of corresponding synchronisation block 410, accumulator block 412 and peak locator 414 shown in FIG. 4. The synchronisation block 806 may output, for example, a data signal W comprising the data bits transmitted in the received signals as PN code symbols. The peak locator 810 may output the value F corresponding to the location of the peak in the combined samples D.

Figure 9:
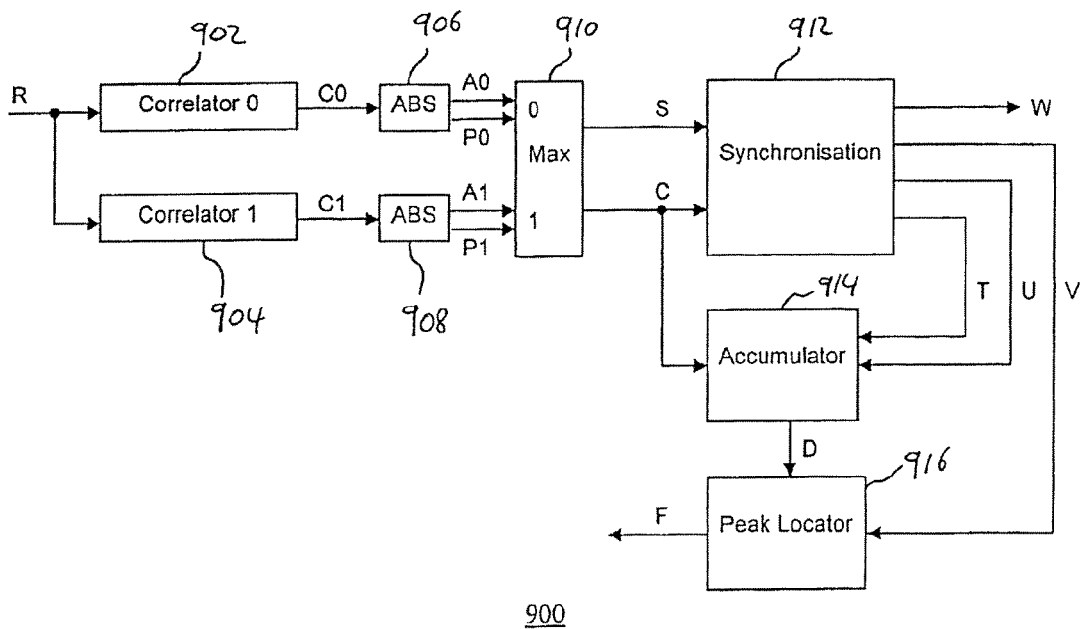
FIG. 9 shows another example of a correlation block according to embodiments of the invention.

FIG. 9 shows another example of a correlation block 900 according to embodiments of the invention. The correlation block 900 may be used in a communication system where, for example, two PN codes are used to transmit four symbols. Each PN code may be used to transmit two respective symbols by choosing the polarity of the transmitted PN code.

The correlation block includes two correlators 902 and 904. Each correlator has a respective ABS block at its output. For example, the first correlator 902 has an ABS block 906 at its output, and the second correlator 904 has an ABS block 908 at its output. The ABS blocks 906 and 908 each provide two outputs, being the absolute magnitude value of the input and a signal indicating the polarity of the input. For example, the first correlator 902 provides a signal C0 to the ABS block 906, the signal C0 comprising correlation samples of the degree of correlation between the demodulated signal R and the PN code associated with the first correlator 902. The ABS block determines the magnitude value of each sample in the signal C0 and provides the magnitude values as signal A0, and the polarity of the samples in C0 as a binary signal P0. For example, the ABS block 906 effectively turns negative values in the signal C0 into positive values in the signal A0, while the positive values in the signal C0 are unchanged in the signal A0. Similarly, the ABS block 908 generates signals A1 and P1 from the signal C1 provided by the second correlator 904.

The signals A0, P0, A1 and P1 are provided to a max block 910 which generates a signal C comprising the maximum magnitude samples from the signals A0 and A1, and also a signal S that indicates which correlator generated each sample in C and also the polarity of that sample when provided by the correlator. Thus, for example, the signal S may be a two-bit signal that indicates one of two correlators and one of two polarities for each sample in the signal C. The signals S and C are provided to a synchronisation block 912, which generates signals T, U, V and W in a manner similar to that described above in respect of other embodiments of the invention. The signals C, T and U are provided to an accumulator block 914, and the signal V is provided to a peak locator 916. The peak locator generates a value F from combined samples D provided by the accumulator block 916. The operation of the synchronisation block 912, accumulator block 914 and peak locator 916 is similar to that described above with respect to corresponding components of other embodiments of the invention.

Figure 10:
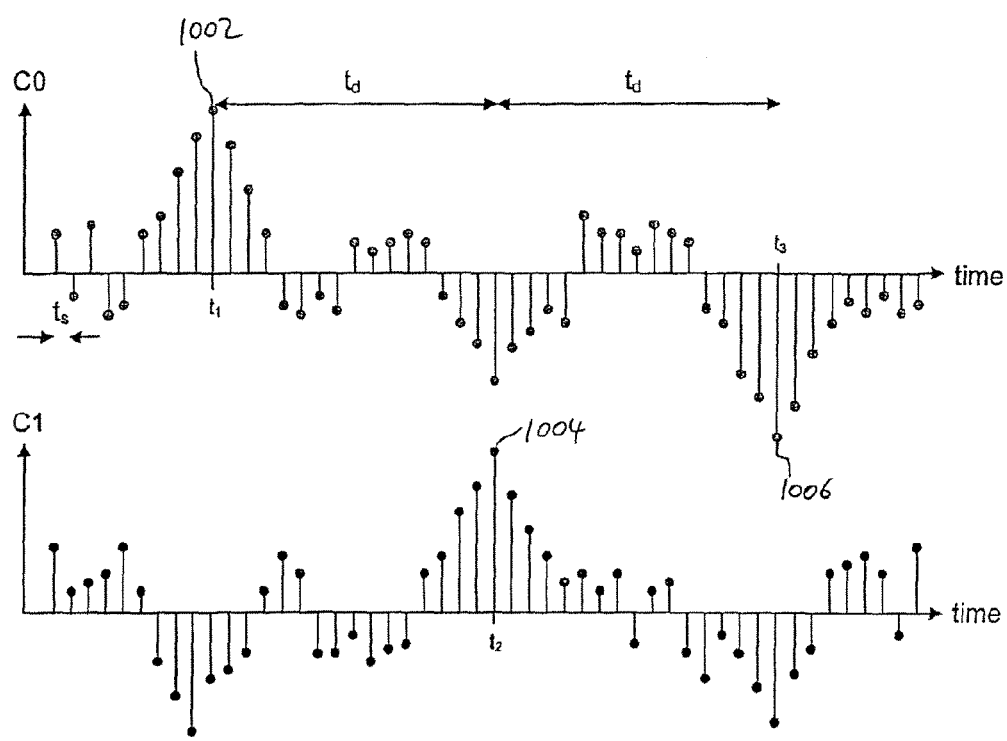
FIG. 10 shows an example of signals generated in the correlation block.
Figure 11:
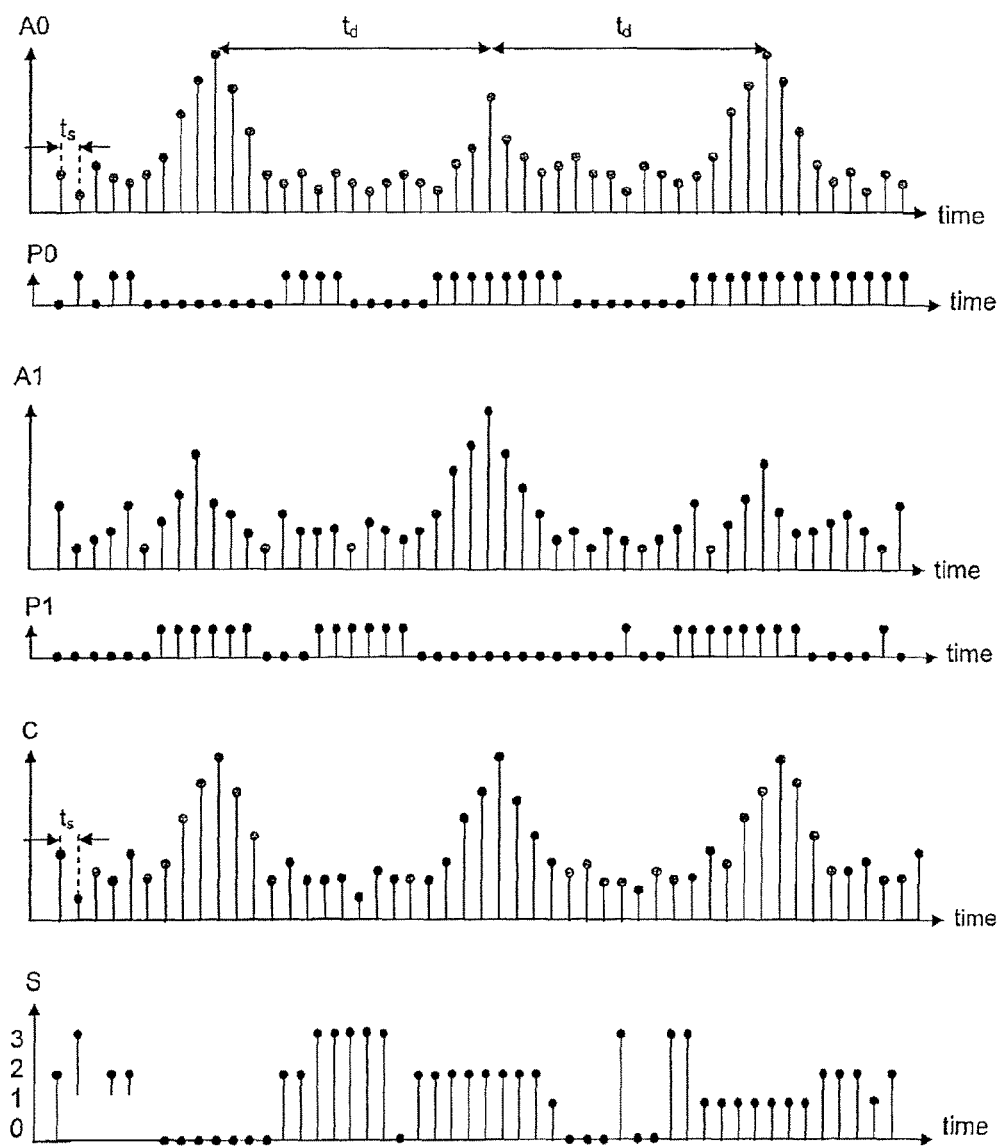
FIG. 11 shows an example of further signals generated in the correlation block.

FIG. 10 shows an example of signals C0 and C1 provided by correlators 902 and 904. The signals are shown over approximately three symbol time periods $t_d$. A first symbol received is a symbol transmitted using a first PN code of a first polarity, as indicated by the first positive peak 1002 in the signal C0 at time $t_1$. A second symbol received is a symbol transmitted using a second PN code of a first polarity as indicated by the positive peak 1004 at time $t_2$. A third symbol received is a symbol transmitted using the first PN code of a second polarity as indicated by the negative peak 1006 at time $t_3$. Thus, three different symbols have been received where the communication system uses two different PN codes and two different polarities to transmit up to four different symbols per symbol time period. FIG. 11 shows the corresponding signals A0 and P0 generated by the first ABS block 906 and the signals A1 and P1 generated by the second ABS block 908, along with the signals C and S produced by the synchronisation block 912. The signal S is used in this example to indicate the correlator and polarity for each sample according to the following table:

|  | First correlator 902 | Second correlator 904 |
|---|---|---|
| Positive polarity | 0 | 2 |
| Negative polarity | 1 | 3 |

The accumulator block 914 uses the signals C, T and U in the manner as described above to combine corresponding samples from multiple symbol time periods to produce combined samples D. The peak locator generates the location F of the peak in the combined samples D, for example using interpolation, according to the signal V.

Figure 12:
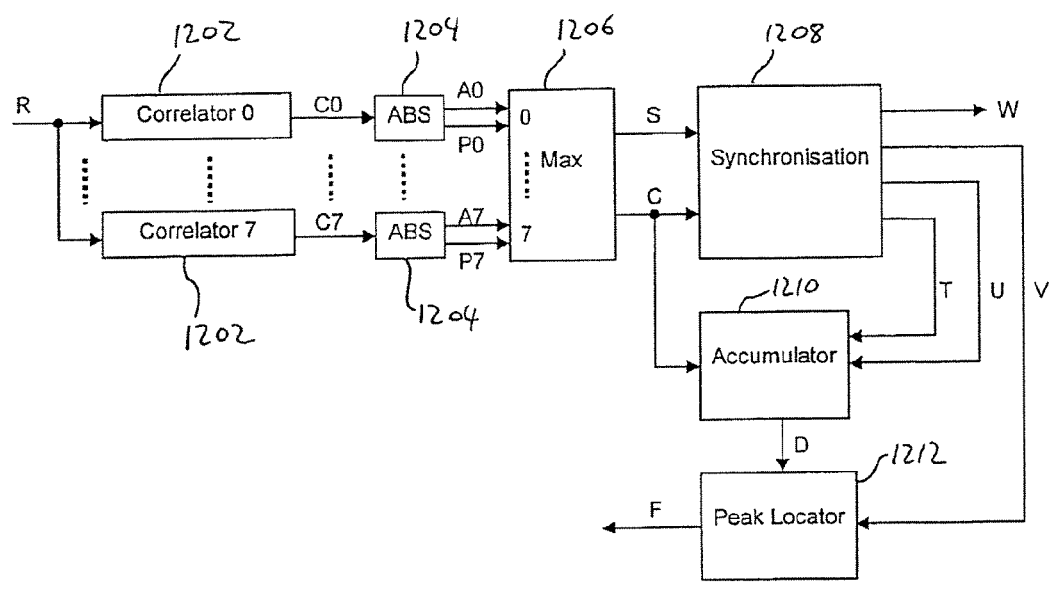
FIG. 12 shows another example of a correlation block according to embodiments of the invention.

FIG. 12 shows another example of a correlation block 1200 according to embodiments of the invention. The correlation block may be used in communication systems where, for example, up to eight PN codes are used, each to transmit up to two different symbols by choosing the polarity of the PN code. Thus, eight PN codes may be used to transmit up to sixteen different symbols.

The correlation block 1200 includes eight correlators 1202 for producing eight correlation sample signals C0 to C7. These signals are each provided to a respective one of eight ABS blocks 1204. The ABS blocks 1204 each generate respective signals A0 to A7 and P0 to P7, which are provided to a maximum sample block 1206. The maximum sample block 1206 generates a signal C comprising the maximum samples, and a signal S that indicates the correlator that produced each sample in the signal C and the polarity when it was provided by the correlator. Thus, for example, the signal S may comprise a four-bit signal that indicates one of sixteen values that indicate one of eight correlators and one of two polarities.

The synchronisation block generates the signals T, U, V and W. The signals C, T and U are provided to an accumulator block 1210 and a peak locator 1212 produces the location F of a peak in combined samples D, provided by the accumulator block 1210, according to the signal V. The operation of the synchronisation block 1208, accumulator block 1210 and peak locator 1212 is substantially as described above with respect to corresponding components of other embodiments of the invention.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. Apparatus for determining a location of at least one peak in correlation output samples, the apparatus comprising:
multiple correlators including at least
a first correlator configured and arranged to compare a bit sequence with a first symbol, having a symbol time period, and to generate correlation output samples having a correlation value that is based upon the comparison of the first correlator; and
a second correlator configured and arranged to compare the bit sequence with a second symbol, different from the first symbol, and to generate correlation output samples based upon the comparison of the second correlator;
circuitry configured and arranged to receive the correlation output samples from the multiple correlators;
circuitry configured and arranged to
select correlation output samples from between samples from each of the correlators based upon the correlation values for the correlation output samples at corresponding times and from different correlators, and
combine the selected samples into combined samples; and
circuitry configured and arranged to determine a position of a peak by analyzing the combined samples for a time period that is longer than the symbol time period.

2. An apparatus as claimed in claim 1, wherein the apparatus is arranged to combine the samples by combining the samples from corresponding sample positions from multiple symbol time periods.

3. An apparatus as claimed in claim 1, wherein the apparatus is arranged to combine the samples by determining the sum of samples from corresponding sample positions from multiple symbol time periods.

4. An apparatus as claimed in claim 1, wherein the apparatus is arranged to determine the position of a peak in the samples during a selected sample time period.

5. An apparatus as claimed in claim 4, wherein the apparatus is arranged to combine the samples by combining a predetermined number of samples from each of the sample time periods around the sample corresponding to the peak in the selected time period into the combined samples.

6. An apparatus as claimed in claim 1, wherein the apparatus is arranged to determine the absolute values of the samples from the at least one correlator.

7. An apparatus as claimed in claim 1, wherein the apparatus is arranged to determine the position of the peak in the combined samples using interpolation.

8. A method of determining a location of a peak in correlator output samples, the method comprising:

generating, using multiple correlators and for a bit stream, correlator output samples having correlation values based upon a comparison between the bit stream and multiple different symbols, each correlation value corresponding to a different correlator and an associated symbol;

receiving the correlator output samples over a plurality of symbol time periods;

combining samples from a period that is longer than the symbol time period into combined samples wherein combining the samples includes determining, for each time period, a maximum sample of the correlator output samples, and combining the maximum samples, for the plurality of bit streams, into the combined samples; and determining the position of a peak in the combined samples.

9. A method as claimed in claim 8, wherein combining the samples comprises combining the samples from corresponding positions in each of the sample time periods.

10. A method as claimed in claim 8, wherein combining the samples comprises determining the sum of samples from corresponding positions in each of the sample time periods.

11. A method as claimed in claim 8, comprising determining the position of a peak in the samples during a selected sample time period.

12. A method as claimed in claim 11, wherein combining the samples comprises combining a predetermined number of samples from each of the sample time periods around the sample corresponding to the peak in the selected time period into the combined samples.

13. A method as claimed in claim 8, comprising determining the absolute values of the samples from the correlators.

14. A method as claimed in claim 8, comprising determining the position of the peak in the combined samples using interpolation.

15. A method of determining an arrival time of a communication, the method comprising:

providing a received signal including the communication to a plurality of devices, determining, for a respective and different code for each device, correlation factors between the received signal and a code corresponding to each device and for different times in time periods corresponding to at least two communication time periods, each communication time period of sufficient length to include at least one code;

combining correlation factors from the plurality of devices from time periods corresponding to at least two communication time periods to produce combined correlation factors wherein combining the samples includes determining a plurality of maximum correlation factors of the correlation factors from each of the devices by comparing correlation factors at corresponding times within the communication time periods, and combining the maximum correlation factors from the plurality of devices into the combined correlation factors;

finding a location of one of a maximum and minimum within the combined correlation factors; and determining the arrival time of the communication from the location.

16. A system for determining an arrival time of a communication, the system being arranged to:

provide a received signal including the communication to a plurality of devices for determining, for a respective and different code for each device, correlation factors between the received signal and a code corresponding to each device and for different times in time periods corresponding to at least two communication time periods, each communication time period of sufficient length to include at least one code;

combine correlation factors from the plurality of devices from time periods corresponding to at least two communication time periods to produce combined correlation factors by determining a plurality of maximum correlation factors of the correlation factors from each of the devices by comparing the correlation factors at corresponding times within the communication time periods, and combining the maximum correlation factors from the plurality of devices into the combined correlation factors;

find a location of one of a maximum and minimum within the combined correlation factors; and determine the arrival time of the communication from the location.

17. A receiver including the apparatus as claimed in claim 1.

18. Non-transitory computer readable storage storing a computer program comprising computer readable code which when executed on a computer system causes the computer system to carry out the method as claimed in one of claim 8 and claim 15.

19. A wireless communications device including the receiver as claimed in claim 17.

20. The apparatus of claim 1, wherein the circuitry configured to select correlation output samples includes synchronization circuitry that is configured and arranged to generate a one or more signals indicating the start and end of the time period that is longer than the symbol time period, and an accumulation signal indicating samples to be combined; and accumulator circuitry configured and arranged to combine the selected samples into combined samples for the time period that is longer than the symbol time period in response to the one or more signals indicating the start and end of the time period and the accumulation signal.

21. The method of claim 15, wherein each of the different codes include pseudo-random noise (PN) codes and wherein determining the correlation factors includes comparing a PN code that is different for each correlator to a shift register storing a bit stream that corresponds to consecutively received, demodulated signals that are shifted into the shift register.

* * * * *